(No Model.)

W. H. PHILLIPS.
DRILL JAR.

No. 511,794. Patented Jan. 2, 1894.

WITNESSES:
David S. Williams.
L. Stewart

INVENTOR:
William H. Phillips
by his atty
Francis T. Chambers

THE NATIONAL LITHOGRAPHING COMPANY,
WASHINGTON, D. C.

UNITED STATES PATENT OFFICE.

WILLIAM H. PHILLIPS, OF PHILADELPHIA, PENNSYLVANIA, ASSIGNOR TO THE BREUIL-PHILLIPS COMPANY, LIMITED, OF SAME PLACE.

DRILL-JAR.

SPECIFICATION forming part of Letters Patent No. 511,794, dated January 2, 1894.

Application filed July 15, 1893. Serial No. 480,585. (No model.)

*To all whom it may concern:*

Be it known that I, WILLIAM H. PHILLIPS, a citizen of the United States, residing in the city and county of Philadelphia, in the State of Pennsylvania, have invented certain new and useful Improvements in Drill-Jars, of which the following is a true and exact description, reference being had to the accompanying drawings, which form a part of this specification.

My invention relates to jars for rock drills and has for its object the production of a drill jar which will not only be strong and effective and capable of being made solidly, but one which can be easily assembled and which can be readily mended if accidentally broken.

My invention can best be described in connection with the drawings in which it is illustrated and in which—

Figure 1:
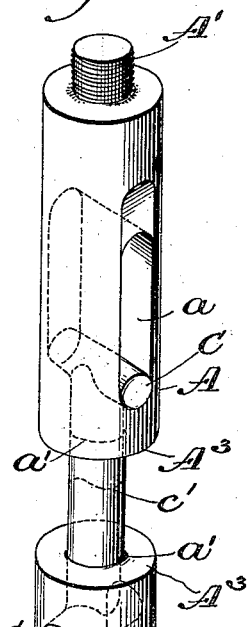
Figure 4:
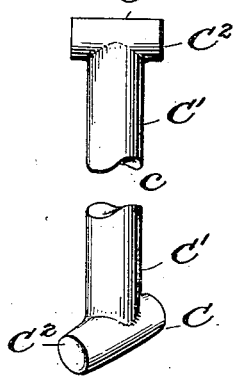
Figure 2:
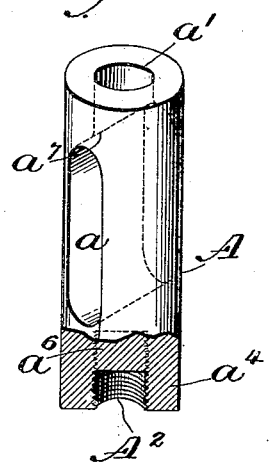
Figure 3:
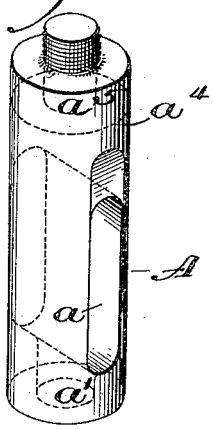

Figure 1 is a perspective side view of my jar completely assembled. Fig. 2 is a side view of one of the links made partly in section to show the screw hole by which it is adapted to be secured to the drill or rope eye. Fig. 3 is a side view of a link similar to that shown in Fig. 2 with a projecting screw instead of a tapped out hole for securing the link to a rope eye or drill. Fig. 4 is a perspective view of two of the bolts which connect the links and Fig. 5 a sectional view of one of the links showing the bolt in position therein.

Figure 5:
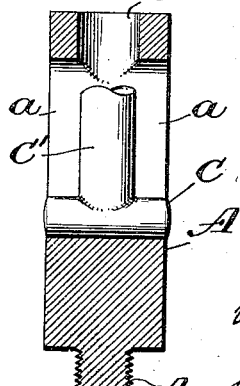
Figure 6:
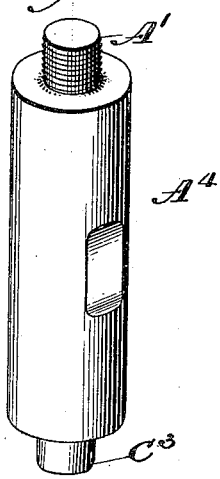

A is a link which I preferably cast or weld all in one piece and of a substantially cylindrical form; in this cylinder is formed a slot $a$ of suitable depth and also a hole $a'$ opening from the slot to one end of the link; at the other end is arranged a projection as $A'$ having screw threads cut on it or a hole as $A^2$ with screw threads tapped therein; these screws $A'$ or $A^2$ serve to engage with corresponding screws or rope eyes or drill blocks and to secure the links to them. A bolt C having a head $C^2$ and a shank $C'$ is arranged to unite the lower link A to which is secured the drill, either to a similar link carried by the drop rope or to a head similar in form to the link A, but not having the slot $a$ or hole $a'$, but furnished with a projection $C^3$ similar in form to the shank $C'$ of the head. In order to place the bolt in position in the link after it is completed the slot $a$ is made longer than the shank $C'$ of the bolt so that the bolt can be pushed in sidewise as indicated in Fig. 5 and, when in position so that the shank of the bolt is opposite the hole $a'$, the shank can be pushed through the hole and will project as shown in Fig. 1; then the end of the shank is welded to the shank $C'$ of a similar bolt in an upper link similar to the lower link or to a projection as $C^3$ on a solid head $A^4$ as shown in Fig. 6. It will be observed that the link has a portion $a^4$ extending some distance from the slot, on which portion is arranged the screw $A'$ or in which is tapped the hole $A^2$. This portion of the link is of substantially the same cross section as the main part of the link and is made of a sufficient size so that in case the screw $A'$ breaks, or the threads at $A^2$ are ripped off if a tapped out hole is used, it will not be necessary to make an entirely new jar but a new screw can be turned as indicated in dotted lines at $a^5$ Fig. 3, or a new hole tapped as indicated at $a^6$ Fig. 2.

By forming the slot $a$ longer than the shank of the bolt it will be noticed that there will always be some play in the slots for the heads of the bolts when the upper link strikes the lower, and by making these links of cylindrical form ample striking surfaces are formed by their heads $A^3$.

By providing an upper head or link and securing the lower or drill link to this, instead of directly to the drop rope as is usual, there is less danger of breaking the rope or straining the beam of the drilling engine since the upper head or link furnishes a weight which is sufficient to jar up the drill without putting any direct pull on the drop rope. It will also be noted that the links are of cylindrical form and as they are of substantially the same cross section as well as of the shape of the hole in which they are to play there will be no tipping of the jar in the hole, and also as the connecting bolt is rigid, a crooked bore, which often occurs with jars whose lost motion device is a rope or other flexible connection, will be prevented.

Having now described my invention, what I claim as new, and desire to secure by Letters Patent, is—

1. As an article of manufacture, a drill jar consisting of a link A having a transverse slot $a$ and a hole $a'$ extending from said slot through the end of the link, and a bolt C having a head $C^2$ adapted to fit in the slot $a$ and a shank $C'$ of a length less than the height of the slot $a$ and of a cross-section less than that of the hole $a'$ the jar being assembled by placing the bolt in the link after both are completed and the end of the shank $C'$ which projects from the end of the link being adapted to be welded or otherwise secured to the lift rope or drill substantially as specified.

2. A drill jar consisting of a link A having a transverse slot $a$ and a hole $a'$ of sufficient size to permit the introduction of a bolt C from the side of the link, a second link having a similar slot and hole, bolts C having heads $C^2$ and shanks $C'$ adapted to be placed in the slots in the links and operating when their shanks are secured together as by welding to form a completed jar, and means on the links A adapted to secure the jar to a drop rope and a drill substantially as specified.

3. A drill jar consisting of a link A having a transverse slot $a$ and a hole $a'$ of sufficient size to permit the introduction of a bolt C from the side of the link, a second link having a similar slot and hole, bolts C having heads $C^2$ and shanks $C'$ adapted to be placed in the slots in the links and operating when their shanks are secured together, as by welding, to form a completed jar, each link having a portion $a^4$ having a screw adapted to engage with and secure the link to a suitable drill bar or rope eye, said portion $a^4$ being of substantially the same cross section as the main portion and of such size that a second screw can be formed on or in it in case of the first screws breaking.

WILLIAM H. PHILLIPS.

Witnesses:
 D. STEWART,
 EDW. F. AYRES.